United States Patent [19]

Huebner et al.

[11] Patent Number: 4,661,556

[45] Date of Patent: Apr. 28, 1987

[54] METHOD OF PRODUCING REINFORCED AQUEOUS EMULSION OF POLYDIORGANOSILOXANE

[75] Inventors: David J. Huebner; Julie K. Landis, both of Midland, Mich.

[73] Assignee: Dow Corning Corporation, Midland, Mich.

[21] Appl. No.: 737,601

[22] Filed: May 24, 1985

[51] Int. Cl.$^4$ ............................................. C08L 83/06
[52] U.S. Cl. .................................... 524/745; 524/837
[58] Field of Search ...................... 524/837, 588, 745

[56] References Cited

U.S. PATENT DOCUMENTS

| | | | |
|---|---|---|---|
| 3,294,725 | 12/1966 | Findley et al. | 260/29.2 |
| 3,360,491 | 12/1966 | Axon | 260/29.2 |
| 3,697,469 | 10/1972 | Ikoma | 528/23 |
| 3,706,695 | 12/1972 | Huebner et al. | 117/226 |
| 4,554,187 | 11/1985 | Grape | 524/588 |
| 4,567,231 | 1/1986 | Huebner | 528/837 |
| 4,568,718 | 2/1986 | Huebner | 524/837 |
| 4,584,341 | 4/1986 | Huebner | 524/837 |
| 4,618,645 | 10/1986 | Bauman | 524/837 |

FOREIGN PATENT DOCUMENTS 57-063 12/1982 Japan .

*Primary Examiner*—C. Warren Ivy
*Attorney, Agent, or Firm*—Edward C. Elliott

[57] ABSTRACT

This invention is a method of producing a colloidal silica reinforced polydiorganosiloxane fluid in aqueous emulsion. The method combines an acidic aqueous colloidal silica sol and low molecular weight hydroxyl endblocked polydiorganosiloxane with anionic emulsifying agent, then homogenizes the mixture to form an emulsion. Because the water in the colloidal silica sol is used to supply water for the emulsion, it is possible to produce emulsions with solid content as high as 80 percent by weight. The emulsion is then mixed with surface active anionic catalyst and aged at room temperature to allow the polydiorganosiloxane to polymerize. Polymerization is halted by adding base to bring the pH to greater than 7. The reinforced polydiorganosiloxane emulsion can be further mixed with diorganotindicarboxylate and aged to give a curable emulsion which yields an elastomer upon removal of the water. A curable emulsion can also be produced by mixing the reinforced polydiorganosiloxane emulsion with diorganotindicarboxylate and alkylorthosilicate.

17 Claims, No Drawings

METHOD OF PRODUCING REINFORCED AQUEOUS EMULSION OF POLYDIORGANOSILOXANE

BACKGROUND OF THE INVENTION

1. Field of the Invention

This invention relates to a method of producing a reinforced silicone water-based emulsion by polymerizing hydroxyl endblocked polydiorganosiloxane in the presence of silica.

2. Background Information

A method of polymerizing siloxanes and silcarbanes in emulsion by using a surface active sulfonic acid catalyst is disclosed by Findlay and Weyenberg in U.S. Pat. No. 3,294,725, issued Dec. 27, 1966. Their method comprises polymerizing and copolymerizing at least one member selected from organosiloxanes of the unit formula $R_nSiO_{4-n/2}$ and silcarbanes having the general formula $HO(R)_2SiQSi(R)_2OH$ in an aqueous medium while in the dispersed state, in the presence of a compound of the formula $R'C_6H_4SO_3H$ as the primary catalyst for the polymerization until the desired increase in molecular aggregation is obtained. These emulsions are stated to be characterized by extreme stability and extremely fine particle size. The products produced were higher molecular weight fluids or solids. In the particular embodiment in which the starting siloxane has a formula

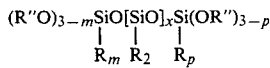

it is stated that the product, after neutralization, is a polysiloxane which does not appear gelled but when removed from the emulsion, does gel to a crosslinked rubber. Fillers can be added to the emulsion so that the strength of the rubber resulting from coagulation of the emulsion is further improved.

Axon discloses a method of polymerizing siloxanes and silcarbanes in emulsion employing organic sulfates of the general formula $R'OSO_2OH$ in U.S. Pat. No. 3,360,491, issued Dec. 26, 1967. His method comprises polymerizing and copolymerizing at least one member of the group consisting of organosiloxanes of the unit formula $R_nSiO_{4-n/2}$ and silcarbanes having the general formula $HO(R)_2SiQSi(R)_2OH$ by polymerizing in an aqueous medium while in a dispersed state in the presence of a compound of the formula $R'OSO_2OH$ until the desired increase in molecular aggregation is obtained. The emulsions are stated as being suitable for release agents and for coating compositions. His embodiment prepared from an alkylalkoxysiloxy endblocked diorganosiloxane is stated as polymerizing to a polysiloxane which does not appear to be gelled, but which when removed from the emulsion, does gel to a crosslinked rubber. Fillers can be added to the emulsion to improve the strength of the rubber resulting from the coagulation of the emulsion. The reinforced emulsion system provides an excellent method of obtaining coatings of tough rubbery siloxane films for release coatings.

A method for emulsion polymerization of organosiloxanes is disclosed by Ikoma in U.S. Pat. No. 3,697,469, issued Oct. 10, 1972. His method emulsifies, in water containing a salt-type anionic surface active agent, an organosiloxane having the unit formula $R_aSiO_{4-a/2}$ and then contacting said emulsion with an acid-type cationic exchange resin. The ion exchange converts the salt-type surface active agent to an acid-type thereby starting polymerization of the organosiloxane by making the emulsion an acid medium with a pH value of less than 4. The method is shown to polymerize organocyclosiloxanes, polysiloxane fluids, mixtures of organocyclosiloxanes and alkylalkoxysilanes, mixtures of organocyclosiloxanes and polysiloxane fluids, and alkylalkoxysilanes to give emulsions of polysiloxanes of increased viscosity. The emulsions are useful as coatings to give release properties, lubricants for textiles, and water repellent for textiles. An example combining an organocyclosiloxane and alkyltrialkoxysilane and polymerizing, then mixing the polymerized emulsion with a 10 percent sol of fine silica particles and dibutyltindioctoate emulsion gave a sheet upon drying which was a rubber.

A method of preparing an electrically conductive silicone emulsion is disclosed by Huebner and Meddaugh in U.S. Pat. No. 3,706,695, issued Dec. 19, 1972. The method dissolves a surface active sulfonic acid in water, mixes in a siloxane fluid and homogenizes the mixture to provide a stable dispersion. The dispersion is heated for at least one hour to polymerize the siloxanes, then adds a nonionic emulsifying agent and neutralizes the acid to give a pH of 6.5 to 9. Finely divided carbon black, a metallic salt of a carboxylic acid and a silane of the formula $RSi(OR')_3$ are then mixed into the emulsion. When the emulsion is applied to a substrate and dried, a heat stable electrically conductive silicone rubber is formed. Satisfactory cure is obtained for a period of about two weeks after mixing. The curability can be restored by adding additional catalyst, alkoxysilane or both.

Japanese Patent Publication No. 57-57063, published Dec. 2, 1982, teaches a silicone aqueous emulsion composition which cures to an elastomer at room temperature with the removal of water. The composition consists of hydroxylterminated diorganopolysiloxane, silane containing at least 3 silicon-bonded hydrolyzable groups per molecule, curing catalyst, emulsifier, and water. In Example 1, they show polymerization of octamethylcyclotetrasiloxane in emulsion with dodecylbenzene sulfonic acid. After polymerization, they add silane or siloxane and tin laurate to give a mixture storable at least 30 days. Removal of water at room temperature gave a film which was elastomeric with a non-tacky surface after sufficient drying time. The non-reinforced elastomer is suggested for use as a coating agent or fiber processing agent.

In U.S. Pat. No. 4,567,231, issued Jan. 28, 1986, Huebner and Saam teach a method of producing a latex of crosslinked polydiorganosiloxane having reinforcement derived from an acidic colloidal silica sol. Their method combines a mixture of hydroxyl endblocked polydiorganosiloxane, an alkyl functional silane, a surface active anionic catalyst, and acidic colloidal silica sol by homogenizing these ingredients immediately after mixing. By maintaining the emulsion at a temperature of from 15° to 30° C. for at least 5 hours at a pH of less than 5, a crosslinked polymer is formed. When water is removed from the latex at room temperature a reinforced elastomer results. It has been found that following the procedure of this invention results in a coating inside the homogenizer, which cures up in time and tends to coat the homogenizer. Removing this coating from the homogenizer is difficult.

SUMMARY OF THE INVENTION

This invention relates to a method of preparing an aqueous emulsion of reinforced polydiorganosiloxane having a molecular weight of at least 5000. The method admixes a hydroxyl-endblocked polydiorganosiloxane of low viscosity with an acidic colloidal silica sol, anionic emulsifying agent and additional water if needed, then homogenizes the mixture to give an emulsion. The emulsion is then admixed with surface active anionic catalyst, then the catalyzed emulsion is maintained at least 5 hours at a pH of less than 5 to allow the polydiorganosiloxane to polymerize. After the desired molecular weight of polydiorganosiloxane is obtained, the pH is raised to greater than 7 to give a stable emulsion of polydiorganosiloxane reinforced with colloidal silica.

When the reinforced polydiorganosiloxane is catalyzed with diorganotindicarboxylate and aged for greater than 6 days at 15° to 30° C., the resulting latex will cure to an elastomer upon removal of the water at room temperature.

When the reinforced polydiorganosiloxane is admixed with diorganotindicarboxylate and alkyl orthosilicate, the mixture is a latex which cures to an elastomer upon removal of the water at room temperature.

DESCRIPTION OF THE INVENTION

A method of preparing an aqueous emulsion of reinforced polydiorganosiloxane having a molecular weight of at least 5000 has been developed. The method consists essentially of (A) homogenizing a mixture consisting essentially of (1) 100 parts by weight of polydiorganosiloxane of the formula $HO(R_2SiO)_xH$ wherein each R is a radical selected from the group consisting of methyl, ethyl, propyl, phenyl, vinyl, allyl, and 3,3,3-trifluoropropyl, and x is an average value in the range of from 3 to 100 inclusive, (2) from 5 to 50 parts by weight of colloidal silica present as an acidic sol in water, (3) sufficient anionic emulsifying agent to give an emulsion particle of an average diameter of from 0.3 to 0.4 micrometers, and (4) additional water if needed to give a non-volatile content of from 50 to 80 percent by weight, to give an emulsion, then; (B) admixing into the emulsion (A) from 15 to 100 millimoles of surface active anionic catalyst per kilogram of polydiorganosiloxane, then; (C) maintaining the catalyzed emulsion at a temperature of from 15° to 30° C. for at least 5 hours at a pH of less than 5 until the desired molecular weight of polydiorganosiloxane is obtained, then; (D) admixing sufficient base to raise the pH of the emulsion to greater than 7; to give a stable emulsion having polydiorganosiloxane of a molecular weight of at least 5,000, reinforced with colloidal silica, and a non-volatile content of from 50 to 80 percent by weight.

This method of producing an emulsion of reinforced polydiorganosiloxane is particularly useful because the surface active anionic catalyst is added to the emulsion of polydiorganosiloxane and colloidal silica after the emulsion is formed. Previous procedures, which emulsified a mixture of polydiorganosiloxane, alkoxy silicon compound, colloidal silica and surface active anionic catalyst, were found to coat the inside of the homogenizer used to form the emulsion with an adherent coating. After operating for a relatively short period of time, the homogenizer had to be shut down, disassembled and cleaned. Cleaning was difficult because the coating was adherent and cured. The method herein claimed was developed to solve this problem.

The method of claim 1 results in an emulsion of polydiorganosiloxane fluid reinforced with colloidal silica. Because the water present in the acidic colloidal silica sol used can be the only water present in making the emulsion, the solids content of the final emulsion can be as high as 80 percent by weight. This emulsion can be used as a coating material. When dried, a reinforced polydiorganosiloxane fluid is produced which is useful as a release coating, as a protective coating for rubber articles and as an electrical insulating coating, for example.

The emulsion of reinforced polydiorganosiloxane fluid can be further processed to yield a curable aqueous latex of reinforced polydiorganosiloxane. The method consists essentially of; (E) admixing into the stable emulsion produced by the method of claim 1, (5) from 0.1 to 2 parts by weight of diorganotindicarboxylate and (F) aging the mixture of (E) for greater than 6 days at 15° to 30° C., to obtain a latex which cures to an elastomer upon removal of the water at room temperature. When the curable aqueous latex of reinforced polydiorganosiloxane produced following this method is dried by removal of the water, a reinforced silicone elastomer results. A film of elastomer, produced by coating a surface with this curable emulsion and removing the water, is cured upon removal of the water. It does not require any additional time or heat in order to cure. The film is useful as a paper coating or as a construction coating, for example. The latex can easily be made with high solids content and a viscosity such that it is a paste material useful as a caulking material.

A second method for producing a curable aqueous latex from the reinforced polydiorganosiloxane emulsion of claim 1, that does not require an aging period, consists essentially of: (G) admixing into the stable emulsion produced by the method of claim 1, (5) from 0.1 to 2 parts by weight of diorganotindicarboxylate, and (6) from 1 to 10 parts by weight of alkylorthosilicate of the formula

$Si(OR')_4$ where R' is a lower alkyl radical of from 1 to 4 carbon atoms inclusive, to obtain a latex which cures to an elastomer upon removal of the water at room temperature. The curable aqueous latex produced by this method is useful in the same type of applications as discussed above.

The hydroxyl endblocked polydiorganosiloxanes used in the method of this invention are well known in the art. The hydroxyl endblocked polydiorganosiloxane can be any of the polydiorganosiloxanes endblocked with hydroxyl radicals and can be represented by the formula

$HO(R_2SiO)_xH$ where each R is a radical selected from the group consisting of methyl, ethyl, propyl, phenyl, vinyl, allyl, and 3,3,3-trifluoropropyl, and mixtures thereof wherein at least 50 percent of the radicals are methyl radicals. The polydiorganosiloxane can be a single type polymer with the same kind of repeating diorganosiloxane units or it can be a combination of two or more kinds of repeating diorganosiloxane units, such as combinations of dimethylsiloxane units and methylphenylsiloxane units. The polydiorganosiloxane can also be a mixture of two or more kinds of polydiorganosiloxanes. The polydiorganosiloxanes are those in which x is an average value in the range of from 3 to 100 inclusive. The preferred polydiorganosiloxanes are those in which x is at least large enough that the viscosity of the polydiorganosiloxane is at least 0.05 Pa·s at 25° C. (x is about 25). A preferred polydiorganosiloxane is a polydimethylsiloxane having a viscosity of from about 0.05 Pa·s to 0.15 Pa·s at 25° C., the value of x for such a material being from about 25 to 80.

The emulsion of crosslinked polydiorganosiloxane of this invention is reinforced by from 5 to 50 parts by weight of colloidal silica, per 100 parts by weight of hydroxyl endblocked polydiorganosiloxane, in the form of an acidic sol in water. The acidic silica sols are commercially available dispersions of colloidal silica in water. They have a pH of about 3. A typical sol contains about 34 percent by weight of colloidal silica having an average particle size of about 20 nanometers, with a pH of about 3.2.

The method of this invention is particularly adopted to make use of colloidal silica in the form of an acidic sol in water. By using the water in the sol as the water to form the emulsion of polydiorganosiloxane and colloidal silica, the latex produced can have a higher total solids content than if the polydiorganosiloxane were hydrolyzed and polymerized, then reinforced by adding a colloidal silica sol.

The anionic emulsifying agent is an alkali metal surface active sulfonate or sulfate. The emulsifying agent can be any of those known to be useful for producing emulsions of polydiorganosiloxanes and water, such as alkali metal sulforicinates; sulfonated glyceryl esters of fatty acids; salts of sulfonated monovalent alcohol esters; amides of amino sulfonic acid, such as the sodium salt of oleyl methyl tauride; sulfonated aromatic hydrocarbon alkali salts, such as sodium alpha-naphthalene monosulfonate; condensation products of naphthalene monosulfonate; condensation products of naphthalene sulfonic acids with formaldehyde; and sulfates, such as sodium lauryl sulfate, triethanol amine lauryl sulfate, and sodium lauryl ether sulfate. Preferred is sodium lauryl sulfate.

The method of this invention uses a surface active anionic catalyst to catalyze the polymerization of the hydroxyl endblocked polydiorganosiloxane. The catalyst is a surface ative sulfonic acid catalyst or a surface active hydrogen sulfate catalyst. The preferred surface active anionic catalyst is selected from the group consisting of a compound of the formula $R^2C_6H_4SO_3H$ wherein $R^2$ is a monovalent hydrocarbon radical of at least 6 carbon atoms; a compound of the formula $R^2OSO_2OH$ wherein $R^2$ is as defined above; a compound of the formula

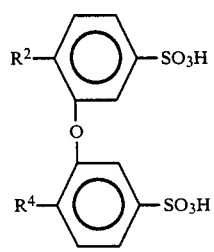

wherein $R^2$ is as defined above and $R^4$ is H or $R^2$, and mixtures thereof. $R^2$ contains at least 6 carbon atoms, and preferably no more than about 18 carbon atoms. $R^2$ includes hexyl, octyl, decyl, dodecyl, cetyl, myricyl, nonenyl, phytyl, and pentadecadienyl radicals. Most preferably $R^2$ has at least 10 carbon atoms. Preferred is the dodecyl radical.

The surface active anionic catalyst as used in this invention performs as a catalyst. It catalyzes the polymerization of the hydroxyl endblocked polydiorganosiloxane.

The sulfonic acids are available commercial products. The preferred sulfonic acids are dodecylbenzene sulfonic acid and dodecyldiphenyloxidedisulfonic acid. Hydrogen lauryl sulfate may be obtained by dissolving sodium lauryl sulfate in water, then adding hydrogen chloride to form the hydrogen lauryl sulfate and sodium chloride. Another method treats the sodium lauryl sulfate solution with a cation exchange resin which exchanges sodium ion for hydrogen ion. The solution of hydrogen lauryl sulfate is then used as the catalyst in the method of this invention. The hydrogen lauryl sulfate can also be produced in situ by homogenizing the polydiorganosiloxane, alkoxy silicon compound, and the acidic colloidal silica sol with sodium lauryl sulfate, then adding hydrogen chloride to the emulsion formed by the homogenization to convert the sodium lauryl sulfate to hydrogen lauryl sulfate catalyst. This in situ process is considered to fall within the scope of the claims.

The method of this invention first homogenizes a mixture of the hydroxyl endblocked polydiorganosiloxane (1), the acidic colloidal silica sol (2) and the anionic emulsifying agent (3). Additional water can be added if desired. The homogenization can be done by any of the known means of producing homogenized material such as a colloid mill. The homogenized material is in the form of an oil-in-water emulsion; that is, an emulsion of particles of polydiorganosiloxane and colloidal silica in a continuous water phase. Based upon 100 parts by weight of the polydiorganosiloxane, from 5 to 50 parts by weight of colloidal silica is used. Preferred is 30 to 40 parts by weight of colloidal silica. Sufficient anionic emulsifying agent is used to give a particle size having an average diameter of from 0.3 to 0.4 micrometers. An average diameter of about 0.34 micrometers is preferred. Lowering the amount of emulsifying agent results in larger particle sizes, while raising the amount of emulsifying agent gives smaller particles, but too much emulsifying agent adversely affects physical properties of the final product. The preferred amount of anionic emulsifying agent is about 43 millimoles of emulsifying agent per kilogram of polydiorganosiloxane.

After the ingredients (1), (2), and (3) are homogenized to give emulsion (A), from 15 to 100 millimoles of the surface active anionic catalyst, per kilogram of polydiorganosiloxane, is added by mixing into emulsion (A). This catalytic surfactant migrates to the surface of the polydiorganosiloxane micelles, where it catalyzes the condensation of the hydroxyl endblocked polydiorganosiloxane to produce a polydiorganosiloxane having a higher molecular weight than the polydiorganosiloxane (1). The polymerization takes place at a temperature of from 15° to 30° C. with a rate sufficiently rapid to be practical. A minimum time of 5 hours is necessary in order to allow a significant increase in the molecular weight of the polydiorganosiloxane. After the polymerization has proceeded to the desired degree, the pH of the emulsion is raised to greater than 7 by admixing a basic material into the emulsion in sufficient amount to cause the pH change. A preferred method of raising the pH uses a dilute solution of sodium hydroxide or ammonium hydroxide. If not neutralized, the polymer continues to condense to form higher molecular weight polymer. The preferred amount of reaction is a function of the intended use of the reinforced polymer. The minimum molecular weight is about 5,000 for most uses. If the reinforced polymer is to be used as a protective coating for rubber articles, for instance, the polydiorganosiloxane needs to be polymerized only to a molecular weight of about 10,000. If the reinforced polymer is to be used as a paper release coating where transfer may be a problem, or as an ingredient in a curable system as discussed further in this application, then the polydiorganosiloxane is polymerized to a higher molecular weight, from 50,000 to 1,000,000 for example.

The aqueous emulsion of reinforced polydiorganosiloxane can be further mixed with additional ingredients; such as additional filler, such as colloidal silica or extending fillers such as ground quartz, diatomaceous earth, and ground mica; pigments such as carbon black or ground iron oxide; and heat stability additives such as ceric hydrate. Any additive should be tested to assure that the stability of the emulsion is not adversely effected.

The reinforced polymer emulsion as produced by the method of claim 1 can be used in the method as claimed in claim 6 to produce a curable aqueous latex. The reinforced polymer emulsion is made curable by admixing with the reinforced polymer emulsion from 0.1 to 2 parts by weight of diorganotindicarboxylate and then aging the mixture for greater than 6 days at 15° to 30° C. During this aging period, the polydiorganosiloxane polymer in the emulsion is converted from a fluid to a crosslinked polymer. When the water is removed at room temperature from the curable latex produced, an elastomer results.

The diorganotindicarboxylate used as a catalyst can be any of those known in the art as useful for catalyzing silicone emulsions of hydroxyl endblocked polydiorganosiloxane and colloidal silica; such as, dibutyltindiacetate, dibutyltindilaurate, and dioctyltindilaurate. The preferred diorganotindicarboxylate is dioctyltindilaurate. The preferred amount of diorganotindilaurate is from about 0.5 to about 1.5 parts by weight for each 100 parts by weight of hydroxyl endblocked polydiorganosiloxane.

The properties of the cured elastomer, produced by drying this curable latex, can be modified by the addition of other ingredients; such as, reinforcing filler, extending filler, pigment, and heat stability additives. It has been found that the tensile strength of the elastomer can be increased by adding up to 40 parts by weight of colloidal silica present as an anionic colloidal silica sol. At the present time, it is thought that the combination of the colloidal silica from the acidic sol having an average particle size of about 20 nanometers and the colloidal silica from the anionic sol having an average particle size of about 4 nanometers gives an unexpected difference in properties when compared to a similar total amount of silica coming only from the acidic sol.

A preferred curable aqueous latex is produced when the acidic colloidal silica sol (2) is present in an amount of from 30 to 40 parts by weight per 100 parts by weight of polydiorganosiloxane, the anionic emulsifying agent is an alkali metal salt of an alkyl sulfate and the non-volatile content is from 65 to 75 percent by weight.

The second method of preparing a curable aqueous latex admixes into the reinforced polydiorganosiloxane emulsion produced by the method of claim 1 from 0.1 to 2 parts by weight of diorganotindicarboxylate and from 1 to 10 parts of alkylorthosilicate. This latex is usable immediately upon mixing. When the water is removed, a cured elastomer results. There is no reaction time necessary as in the first method of obtaining a curable latex discussed above. A preferred method uses from 0.5 to 0.6 parts by weight of dioctyltindilaurate as the diorganotindicarboxylate and from 3 to 4 parts by weight of alkylorthosilicate. The alkyl radical can be methyl, ethyl, butyl, or propyl with ethyl being preferred. Ethylorthosilicate is a readily available commercial product.

The properties of this second curable aqueous latex can also be varied by the addition of other ingredients in the same manner as that discussed above for the first curable latex.

The following examples are presented for purposes of illustrating the invention and should not be construed as limiting the scope of the invention which is properly delineated in the claims. All parts are parts by weight.

EXAMPLE 1

A mixture was made by mixing together 1214 g of a hydroxyl endblocked polydimethylsiloxane fluid having a viscosity of about 0.09 Pa·s at 25° C., 720 g of an acidic colloidal silica sol having about 34 percent by weight colloidal silica having an average particle size of about 20 nanometers and a pH of 3.2, 49.6 g of a 30 percent by weight dispersion in water of sodium lauryl sulfate (51.6 millimoles) and 95.2 g of water. This mixture was homogenized by running it through a Gaulin Laboratory Homogenizer for 2 passes. The emulsion contained dispersed particles of about 0.3 micrometers average diameter. After homogenization, the emulsion (1870 g) was admixed with 5.3 g of dodecylbenzene sulfonic acid (16.3 millimoles) to catalyze polymerization of the polydimethylsiloxane. This catalyzed mixture was held at room temperature for 21 hours at which time a solution of sodium hydroxide was added in sufficient amount to raise the pH to 10 to 11. This reinforced emulsion contained approximately 20 parts by weight silica per 100 parts by weight polymer and had a non-volatile content of about 70 percent by weight.

The reinforced emulsion was then catalyzed and further reinforced by mixing 55 g of the above emulsion with 0.38 g of an emulsion containing 50 percent by weight of dioctyltindilaurate and 6.4 g of an alkaline colloidal silica sol having a silica content of 15 percent by weight and an average particle size of about 4 nanometers and then allowed to stand at room temperature for 1 week to allow reaction of the ingredients. This curable aqueous latex was about 65 percent by weight non-volatile material and 22 parts by weight total silica. The latex had 0.6 parts by weight of dioctyltindilaurate per 100 parts by weight of polymer.

A sample of this latex was then poured into a container and exposed to the atmosphere and dried for one week to provide an elastomer. This elastomer was tested and found to have a tensile strength of 3.03 MPa and an elongation at break of 870 percent.

The latex was further compounded following a procedure disclosed in U.S. Pat. No. 4,559,369, issued Dec. 17, 1985, to show a use for the latex.

A 55 g sample of the above latex was mixed with 2 g of a 35 percent by weight solution of disodium N-octadecylsulfosuccinimate and 0.19 g of lauryl alcohol. This mixture was placed into an aerosol container and charged with 3 to 4 ml of propane as blowing agent and propellant. When expelled onto a surface, the contents of the aerosol container formed a stable froth which air dried in about 15 hours at standard laboratory conditions to form an open cell foam. The foam had a tensile strength of about 0.14 MPa and an elongation of about 200 percent. Previous foams made with similar procedures but having lower non-volatile content and only one type of colloidal silica had a tensile strength of about 0.07 MPa, 50 percent elongation, and required about 24 hours to dry.

EXAMPLE 2

An emulsion was prepared by mixing 1518 g of hydroxyl endblocked polydimethylsiloxane, 900 g of colloidal silica sol, 62 g of sodium lauryl sulfate, and 119 of water, all the same ingredients as in Example 1. The mixture was cooled to 10° C. and run through the homogenizer, recooled to 12° C. and given a second pass through the homogenizer. It heated up to 33° C. in the homogenizer. After the second pass, it had a viscosity of about 2 Pa·s at room temperature. The emulsion had a particle size of about 0.3 micrometers. The emulsion was then catalyzed with 6.8 g of dodecylbenzene sulfonic acid (20.9 millimols) for 2400 g of emulsion. The pH was about 3.2. The catalyzed mixture was held at room temperature for 30 hours at which time it was admixed with sodium hydroxide solution to raise the pH to approximately 10 to stop the polymerization A sample of the emulsion was tested for molecular weight. The polymer was found to have a molecular weight of about 247,000.

A sample of this emulsion was catalyzed with dioctyltindilaurate and further reinforced with alkaline colloidal silica as in Example 1. The emulsion was then dried and tested as in Example 1 and found to have a tensile strength of 3.6 MPa and an elongation at break of 960 percent.

Additional samples of the above emulsion were catalyzed with dioctyltindilaurate to give 0.6, 1.0, and 2.0 parts by weight dioctyltindilaurate per 100 parts by weight of polymer. Each emulsion was aged at room temperature to evaluate the shelf life of the catalyzed emulsion. The results were:

| Amount of Catalyst | Shelf Life |
| --- | --- |
| 0.6 | stable for greater than 6 months |
| 1.0 | thickened to unuseable in 1 to 2 months |
| 2.0 | gelled in 1 to 2 weeks |

EXAMPLE 3

The procedure of Example 1 was followed, using the materials of Example 1, to make a reinforced emulsion; except enough of the colloidal silica sol was used to give 25 parts by weight of colloidal silica per 100 parts by weight of polymer. This procedure yielded a reinforced emulsion containing 25 parts by weight of silica, per 100 parts by weight of polymer; and 1.2 parts by weight of surfactant; with a non-volatile content of 65%. The polymer present in this emulsion had a molecular weight of 240,000.

A portion of the reinforced emulsion containing 100 parts by weight of polymer was then mixed with sufficient dioctyltindilaurate emulsion to give 0.6 parts by weight of dioctyltindilaurate and sufficient alkaline colloidal silica sol to give 3 parts by weight. After aging for a week, the catalyzed emulsion was dried into an elastomer film and tested as in Example 1. The elastomer had a tensile strength of 2.9 MPa and an elongation at break of 783 percent.

EXAMPLE 4

A series of emulsions were prepared as in Example 1 using sufficient amounts of hydroxyl endblocked polydimethylsiloxane and acidic colloidal silica to give 10, 20, 30, and 40 parts by weight of silica per 100 parts by weight of polymer while keeping the non-volatile content at 60 percent by weight. In each case, the sodium lauryl sulfate was 4.1 parts by weight per 100 parts by weight of polymer and the dioctyltindilaurate was 0.6 parts by weight.

The reinforced and catalyzed emulsions were dried into elastomeric films and tested as in Example 1 with the results as shown in Table I.

TABLE I

| Parts Silica Added During Polymerization | Tensile Strength MPa | Elongation percent | Durometer |
| --- | --- | --- | --- |
| 10 | 1.34 | 649 | 20 |
| 20 | 1.70 | 518 | 33 |
| 30 | 3.38 | 686 | 50 |
| 40 | 3.84 | 568 | 76 |

Another sample was prepared by taking a portion of the above emulsion having 10 parts by weight of silica and adding sufficient alkaline colloidal silica sol of Example 1 to give an additional 10 parts of silica. This emulsion was dried into an elastomeric film and tested as in Example 1 with the results shown in Table II.

TABLE II

| Parts of Silica Added | | Tensile | | |
| --- | --- | --- | --- | --- |
| During Polymerization | After Polymerization | Strength MPa | Elongation percent | Durometer |
| 10 | 10 | 3.64 | 499 | 67 |
| 20 | 0 | 1.70 | 518 | 33 |

This sample having 20 parts of silica comprised of both types of silica had a higher durometer and tensile strength and lower elongation than that having 20 parts of the acidic silica only.

Other samples were prepared having a total of 40 parts by weight of silica from the emulsions above by adding the appropriate amount of alkaline colloidal silica of Example 1 to the different emulsions. The emulsions were then dried to an elastomer and tested as in Example 1 with the results shown in Table III.

TABLE III

| Parts of Silica Added | | Tensile | | |
| --- | --- | --- | --- | --- |
| During Polymerization | After Polymerization | Strength MPa | Elongation percent | Durometer |
| 10 | 30 | 3.07 | 72 | 86 |
| 20 | 20 | 3.09 | 105 | 84 |
| 30 | 10 | 2.65 | 152 | 78 |
| 40 | 0 | 3.84 | 568 | 76 |

The samples made with 40 parts of both types of silica had higher durometers; but lower tensile strength and elongation, than those made with all the silica added as the acidic silica during polymerization.

EXAMPLE 5

Samples of the reinforced emulsion of Example 3 were compounded and tested as foam.

An emulsion compound was prepared by mixing together 550 g of the reinforced emulsion of Example 3 (65 percent non-volatile material), 20 g of a 35 percent solution of disodium N-octadecylsulfosuccinimate, 2 g of lauryl alcohol, 64 g of the alkaline colloidal silica sol of Example 1 (3 parts by weight of silica per 100 parts by weight of polymer), and 9.6 g of ethylorthosilicate.

Portions of this compound (100 g each) were then mixed with 1 g of 30 percent solids by weight of an acrylic thickening agent and various amounts of the tin containing catalyst of Example 1 (50% solids) to give the amounts of tin compound shown in Table I. These mixtures were placed in aerosol cans and charged with 6 ml of propane as blowing agent and propellant.

A portion of the contents of each aerosol container was then sprayed out onto a surface and allowed to dry. After 24 hours storage in the can, another portion was sprayed out into a foam and dried. Samples of the foams were then measured, giving the properties shown in Table IV. The highest tensile strength and elongation was obtained at the lower catalyst levels.

TABLE IV

| Catalyst parts by weight | Tensile Strength MPa | Elongation percent |
|---|---|---|
| sprayed after mixing | | |
| 0.6 | poor cure | — |
| 1.0 | 0.13 | 276 |
| 1.5 | 0.10 | 250 |
| 2.0 | 0.07 | 160 |
| 3.0 | 0.06 | 170 |
| sprayed after 24 hours storage | | |
| 0.6 | 0.22 | 270 |
| 1.0 | 0.13 | 230 |
| 1.5 | 0.12 | 293 |
| 2.0 | 0.10 | 275 |
| 3.0 | 0.08 | 253 |

The foam having the lowest amount of catalyst gave the highest tensile strength and elongation, but the lowest amount of catalyst required an aging time before a good cure was obtained. When the reinforced emulsion is used as a foam, a higher amount of catalyst, based upon the amount of polydiorganosiloxane, is needed to obtain cure immediately upon mixing because of the additional ingredients present in the foam.

That which is claimed is:

1. A method of preparing an aqueous emulsion of reinforced polydiorganosiloxane having a molecular weight of at least 5000 consisting essentially of
   (A) homogenizing a mixture consisting essentially of
      (1) 100 parts by weight of polydiorganosiloxane of the formula $HO(R_2SiO)_xH$ wherein each R is a radical selected from the group consisting of methyl, ethyl, propyl, phenyl, vinyl, allyl, and 3,3,3-trifluoropropyl, and x is an average value in the range of from 3 to 100 inclusive,
      (2) from 5 to 50 parts by weight of colloidal silica present as an acidic sol in water,
      (3) sufficient anionic emulsifying agent to give an emulsion particle of an average diameter of from 0.3 to 0.4 micrometers, wherein said emulsifying agent is an alkali metal surface active sulfonate or sulfate, and
      (4) additional water if needed to give a non-volatile content of from 50 to 80 percent by weight,
   to give an emulsion, then,
   (B) admixing into the emulsion (A) from 15 to 100 millimoles of surface active anionic catalyst per kilogram of polydiorganosiloxane, wherein said catalyst is a surface active sulfonic acid catalyst or a surface active hydrogen sulfate catalyst, then
   (C) maintaining the catalyzed emulsion at a temperature of from 15° to 30° C. for at least 5 hours at a pH of less than 5 until the desired molecular weight of polydiorganosiloxane is obtained, then
   (D) admixing sufficient base to raise the pH of the emulsion to greater than 7, to give a stable emulsion having polydiorganosiloxane of a molecular weight of at least 5,000, reinforced with colloidal silica, and a non-volatile content of from 50 to 80 percent by weight.

2. The method of claim 1 in which the colloidal silica (2) is present in an amount of from 30 to 40 parts by weight.

3. The method of claim 1 in which the non-volatile content is from 65 to 75 percent by weight.

4. The method of claim 1 in which the anionic emulsifying agent (3) is an alkali metal salt of an alkyl sulfate.

5. The method of claim 1 in which the surface active anionic catalyst is selected from the group consisting of a compound of the formula $R^2C_6H_4SO_3H$ wherein $R^2$ is a monovalent hydrocarbon radical of at least 6 carbon atoms, a compound of the formula $R^2OSO_2OH$ wherein $R^2$ is as defined above, a compound of the formula

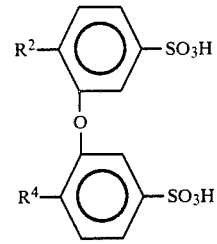

wherein $R^2$ is as defined above and $R^4$ is hydrogen or $R^2$, and mixtures thereof.

6. A method of preparing a curable aqueous latex of reinforced polydiorganosiloxane consisting essentially of
   (E) admixing into the stable emulsion produced by the method of claim 1, (5) from 0.1 to 2 parts by weight of diorganotindicarboxylate and
   (F) aging the mixture of (E) for greater than 6 days at 15° to 30° C.,
to obtain a latex which cures to an elastomer upon removal of the water at room temperature.

7. The method of claim 6 in which from 0 to 40 parts by weight of colloidal silica present as an anionic colloidal silica sol is added per 100 parts by weight of polydiorganosiloxane (1) in step (E).

8. The method of claim 6 in which the colloidal silica (2) is present in an amount of from 30 to 40 parts by weight, the anionic emulsifying agent is an alkali metal salt of an alkyl sulfate, and the non-volatile content is from 65 to 75 percent by weight.

9. A method of preparing a curable aqueous latex of reinforced polydiorganosiloxane consisting essentially of
(G) admixing into the stable emulsion produced by the method of claim 1,
(5) from 0.1 to 2 parts by weight of diorganotindicarboxylate, and
(6) from 1 to 10 parts by weight of alkylorthosilicate of the formula $$Si(OR')_4$$

where R' is a lower alkyl radical of from 1 to 4 carbon atoms inclusive,
to obtain a latex which cures to an elastomer upon removal of the water at room temperature.

10. The method of claim 9 in which the colloidal silica (2) is present in an amount of from 20 to 40 parts by weight, the anionic emulsifying agent is an alkali metal salt of an alkyl sulfate, and the non-volatile content is from 65 to 75 percent by weight.

11. The method of claim 9 in which from 0 to 40 parts by weight of colloidal silica present as an anionic colloidal silica sol is added per 100 parts by weight of polydiorganosiloxane (1) in step (G).

12. The method of claim 11 in which diorganotindicarboxylate (5) is from 0.5 to 0.6 parts by weight of dioctyltindilaurate and alkylorthosilicate (6) is from 3 to 4 parts by weight.

13. The aqueous emulsion produced by the method of claim 1.

14. The curable aqueous latex produced by the method of claim 7.

15. The curable aqueous latex produced by the method of claim 8.

16. The curable aqueous latex produced by the method of claim 9.

17. The curable aqueous latex produced by the method of claim 12.

* * * * *